(12) United States Patent
McDonald et al.

(10) Patent No.: US 7,797,007 B2
(45) Date of Patent: Sep. 14, 2010

(54) SYSTEM AND METHOD TO DYNAMICALLY MANAGE A TALK GROUP SIGNALING TYPE

(75) Inventors: Daniel J. McDonald, Cary, IL (US);
Robert A. Biggs, Evanston, IL (US);
Jerald M. Gard, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 953 days.

(21) Appl. No.: 11/424,381

(22) Filed: Jun. 15, 2006

(65) Prior Publication Data

US 2007/0293259 A1 Dec. 20, 2007

(51) Int. Cl.
H04B 7/00 (2006.01)
(52) U.S. Cl. ............ 455/518; 455/519; 455/552.1
(58) Field of Classification Search ......... 455/553.1,
455/520, 521, 518, 519, 435.1, 437, 438,
455/420, 406, 414.1, 90.2, 507, 552.1; 370/401,
370/328, 296, 310, 331; 709/227, 204
See application file for complete search history.

(56) References Cited

U.S. PATENT DOCUMENTS

| | | | | |
|---|---|---|---|---|
| 5,625,623 A * | 4/1997 | Kent et al. | ............ | 370/280 |
| 5,784,388 A * | 7/1998 | Knox | ............ | 714/756 |
| 5,862,470 A * | 1/1999 | Damghani | ............ | 455/418 |
| 5,987,331 A * | 11/1999 | Grube et al. | ............ | 455/509 |
| 6,493,326 B1 | 12/2002 | Ramachandran | | |
| 6,922,561 B2 * | 7/2005 | Chen et al. | ............ | 455/435.1 |
| 2002/0132635 A1 * | 9/2002 | Girard et al. | ............ | 455/552 |
| 2003/0041150 A1 * | 2/2003 | Passman et al. | ............ | 709/227 |
| 2003/0153343 A1 | 8/2003 | Crockett | | |
| 2004/0190483 A1 * | 9/2004 | Shahaf et al. | ............ | 370/347 |
| 2004/0198353 A1 * | 10/2004 | Quick, Jr. | ............ | 455/435.1 |
| 2004/0203770 A1 * | 10/2004 | Chen et al. | ............ | 455/435.1 |
| 2005/0044256 A1 * | 2/2005 | Saidi et al. | ............ | 709/232 |
| 2005/0073972 A1 * | 4/2005 | Hasegawa | ............ | 370/328 |
| 2005/0122922 A1 * | 6/2005 | Wu et al. | ............ | 370/310 |
| 2005/0153736 A1 * | 7/2005 | Ganton | ............ | 455/553.1 |
| 2006/0053225 A1 * | 3/2006 | Poikselka et al. | ............ | 709/227 |
| 2006/0058052 A1 * | 3/2006 | Plestid et al. | ............ | 455/519 |
| 2006/0104293 A1 * | 5/2006 | Kopp et al. | ............ | 370/401 |
| 2006/0229090 A1 * | 10/2006 | LaDue | ............ | 455/507 |
| 2008/0132210 A1 * | 6/2008 | Korneluk et al. | ............ | 455/414.1 |

* cited by examiner

*Primary Examiner*—Tan Trinh
(74) *Attorney, Agent, or Firm*—Indira Saladi; Valerie M. Davis

(57) ABSTRACT

A transmission capability of a mobile station that requests to be affiliated with a talk group is received. It is then determined whether to alter a current transmission mode of the talk group based at least in part upon the transmission capability of the mobile station, the current transmission mode of the talk group, and the transmission mode of one or more radio frequency (RF) sites associated with the talk group.

16 Claims, 4 Drawing Sheets

US 7,797,007 B2

SYSTEM AND METHOD TO DYNAMICALLY MANAGE A TALK GROUP SIGNALING TYPE

FIELD OF THE INVENTION

The field of the invention relates to conducting communications in networks and, more specifically, to determining a communication mode of a talk group within these networks.

BACKGROUND OF THE INVENTION

Mobile stations operate in various operating modes, use different technologies, and utilize different protocols as they move across different networks or across the same network. For example, mobile stations may operate according to frequency division multiple access (FDMA) or time division multiple access (TDMA) technologies. In other examples, mobile stations may operate according to full rate or half rate vocoder technologies.

These different modes may determine different operating characteristics of the mobile station. In one example, the operating mode determines whether the mobile station utilizes full rate vocoder capabilities, or, alternatively, both full and half rate vocoder capabilities. Being able to operate the mobile station according to different modes allows the mobile station to operate more efficiently and effectively as it moves across different operational environments.

Unfortunately, situations exist where it is difficult or impossible to operate mobile stations according to multiple types of technologies or protocols. For example, when full rate capable mobile stations attempt to affiliate with a half-rate vocoder talk group, the full rate vocoder capable mobile station will not be able to communicate with the talk group since the talk group uses half-rate vocoder technology signaling and full rate vocoder capable mobile stations cannot utilize half-rate vocoder signaling. Consequently, the mobile station is left without communication capabilities.

In another example, when a half-rate vocoder capable mobile station roams to a radio frequency (RF) site that does not support half-rate vocoder signaling (e.g., legacy full rate vocoder signaling), the mobile station will not be able to operate until the user changes to a talk group that supports full rate vocoder signaling. As with the previous example, the user is left without communication capabilities. Because of the above-mentioned problems, it is difficult for users to operate mobile stations in various operating modes, using different technologies, and according to different protocols as the user moves across different networks or across the same network.

BRIEF DESCRIPTION OF THE DRAWINGS

The above needs are at least partially met through provision of a system and method for dynamically changing the mode of a talk group described in the following description, particularly when studied in conjunction with the drawings, wherein.

Figure 1:
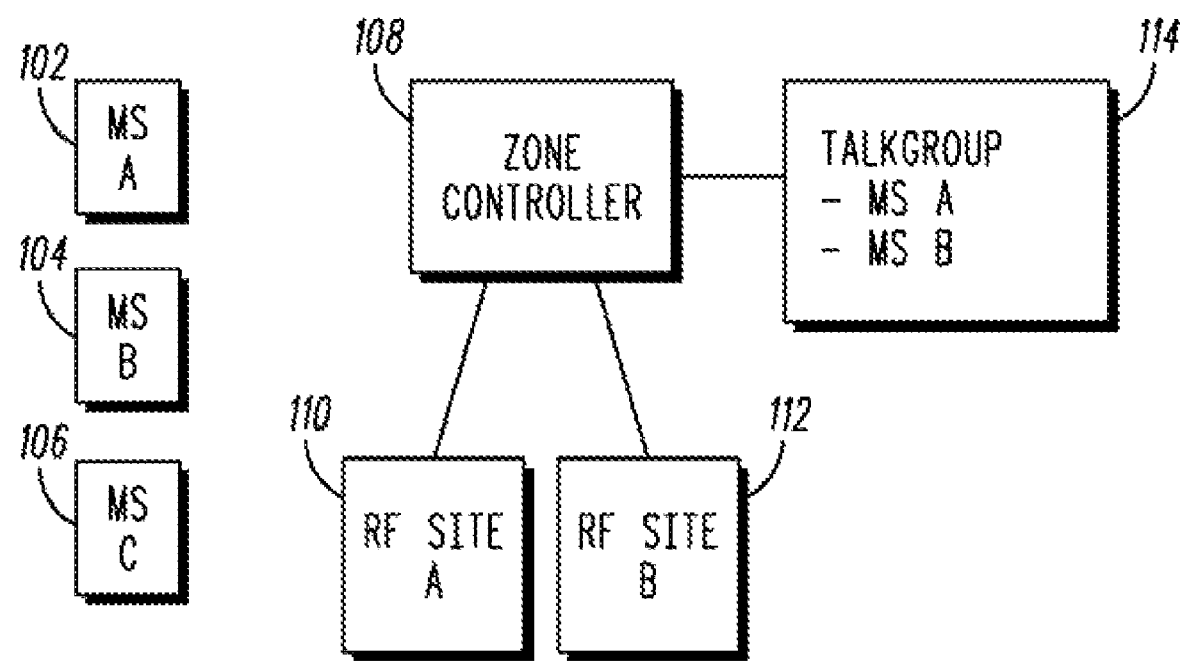
FIG. 1 is a block diagram of a system for dynamically adjusting the operating mode of a talk group according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method is provided to determine the transmission mode of a talk group as mobile stations roam between radio frequency (RF) sites or affiliate with the talk group. The approaches provided herein allow the user to communicate from their mobile station even as they roam through networks, encounter RF sites, and select talk groups that are operating according to various transmission modes.

In many of these embodiments, a mobile station (having a transmission capability) registers at a network entity such as a zone controller via an RF site. When the mobile station then requests to be affiliated with a talk group, the network entity then determines whether to alter the current transmission mode of a talk group based upon the transmission capability of the mobile station, the current transmission mode of the talk group, and the transmission capability of one or more radio frequency (RF) sites associated with the talk group.

The transmission capability of the mobile station and the transmission mode of the talk group may take a number of different forms. For example, the modes may provide a full rate vocoder-only capability or a full and half-rate vocoder capability. In other examples, the modes may relate to different technologies (e.g., FDMA and TDMA).

As mentioned, the determination of whether to alter the operating mode of the talk group may depend upon various factors or combinations of factors. For instance, the determination may depend upon a comparison between a first number of mobile stations operating at the talk group according to a first mode to a second number of mobile stations operating according to a second mode.

The RF site capabilities may also be used to determine the transmission mode of the talk group. For example, if there is a mobile station operating at an RF site that is only capable of full rate vocoder operation, the talk group may operate in the full vocoder mode.

In another example, a talk group call is active in a first transmission mode (e.g., TDMA or half-rate) and a second mobile station that is only capable of operating in a second transmission mode (FDMA or full rate) affiliates with the same talk group during the active call. When this occurs, the active call is allowed to continue in the current transmission mode (TDMA or half-rate) without the affiliating mobile station participating in the call. However, once the call ends, subsequent transmissions, until the talk group transmission mode is reevaluated, may occur in a second transmission mode (e.g., FDMA or full rate vocoder) to allow all mobile stations in the talk group to participate in the call.

In some of these embodiments, a user preference may also be obtained to dynamically determine whether to alter the talk group mode. For example, the user preference may be FDMA-only, full rate vocoder only, TDMA-only, half-rate vocoder only, or dynamic. Other examples of user preferences are possible.

Thus, approaches are provided that allow users to operate their mobile stations according to multiple modes and traverse networks without losing communications. These approaches are efficient to use and enhance user satisfaction with their experience within the network.

Referring now to FIG. 1, one example of a system for dynamically adjusting the transmission mode of a talk group is described. A first mobile station 102 (MS A), a second mobile station 104 (MS B), and a third mobile station 106 (MS C) operate within a network that includes a first RF communication site 110 (RF site A) and a second RF communication site 112 (RF site B).

The mobile stations 102, 104, and 106 may include a variety of different mobile communication devices. For example, the mobile stations 102, 104, and 106 may be two-way radios, cellular phones, pagers, personal digital assistants, or personal computers. Additionally, the mobile stations 102, 104, and 106 and RF sites 110 and 112 may operate according to any communication protocol or technology. For example, the mobile stations 102, 104, and 106 and RF sites 110 and 112 may operate in a frequency division multiple access (FDMA) mode, time division multiple access (TDMA) mode (e.g., 2 to 1 TDMA, 4 to 1 TDMA), full rate vocoder mode, half-rate vocoder mode, or combinations of these modes. Other examples of mobile stations and operating modes for these mobile stations are possible.

The first and second RF sites 110 and 112 are coupled to a zone controller 108. The zone controller 108 determines the transmission mode of a talk group 114 based upon a variety of factors. For example, the zone controller 108 may determine the transmission mode of a talk group based upon the transmission capabilities of mobile station, the current talk group mode, the transmission mode of one or more RF sites, and/or user preferences. Other factors may also be considered when determining the mode of the talk group.

The zone controller 108 maintains information concerning the talk group 114, for example, in a memory device that may or may not be co-located at the zone controller 108. In this example, the talk group 114 includes a first mobile station 102 (MS A) and a second mobile station 104 (MS B). This talk group 114 has an associated transmission mode, for example, FDMA mode, TDMA mode (e.g., 2 to 1 TDMA, 4 to 1 TDMA), full rate vocoder mode, half-rate vocoder mode, or some combination of these modes.

In one example of the operation of the system of FIG. 1, a third mobile station 106 (MS C), which has previously registered its transmission capabilities, attempts to affiliate with the talk group 114. As mentioned, the talk group 114 already has two current members (MS A and MS B). When attempting to affiliate, this new mobile station 106 (MS C) communicates to the zone controller 108 indicating the talk group it will monitor. The zone controller 108 receives the information, for example via the RF site 110 (RF site A) and determines whether to alter the current transmission mode of the talk group 114. The determination may be based upon the transmission capability of the mobile station 106, the current transmission mode of the talk group, the transmission mode of any of the RF sites 110 and 112 associated with the talk group 114, or user preference information.

In one example of determining whether to make an adjustment, the determination may be based upon whether a first number of mobile stations operating at the talk group according to a first mode exceeds a second number of mobile stations operating according to a second mode. Alternatively, other combinations of decision making can be used such as one or more mobile stations operating in legacy mode (e.g., full rate vocoder) and any number of mobile stations operating in other modes (e.g., both full and half rate vocoder), selecting the legacy mode of operation.

In another example, a talk group call is active in a first transmission mode (e.g., TDMA or half-rate) and the mobile station 106 that is only capable of operating in a second transmission mode (FDMA or full rate) affiliates with the talk group 114 during the active call. When this occurs, the active a call is allowed to continue in the current transmission mode (TDMA or half-rate) without the affiliating mobile station participating in the call. However, once the call ends, subsequent transmissions, until the talk group transmission mode is reevaluated, may occur in the second transmission mode (e.g., FDMA or full rate vocoder) to allow the mobile stations 102 and 104 and 106 in the talk group 114 to participate in the call.

The user may also select preferences for the current transmission mode of the talk group 114. For example, the user may select the modes of FDMA-only (the talk group always operates in FDMA mode regardless of the capabilities of the mobile stations), full rate vocoder only (the talk group always operates in full rate vocoder mode regardless of the capabilities of the mobile stations), TDMA-only (the talk group operates in TDMA mode regardless of the capabilities of the mobile stations), half-rate vocoder only (the talk group operates in half-rate vocoder mode regardless of the capabilities of the mobile stations), and dynamic (the capabilities of the mobile stations and the RF site determine the transmission mode of the talk group). The user may enter these preferences in a variety of different ways, for example, from the mobile station or from a dedicated terminal coupled to the zone controller 108.

In making the determination to alter the mode of the talk group 114, different weights or priorities may be assigned to the different factors considered. For example, the transmission mode of a mobile station may take highest priority. In another example, the preference of the user may take the highest priority.

Figure 2:
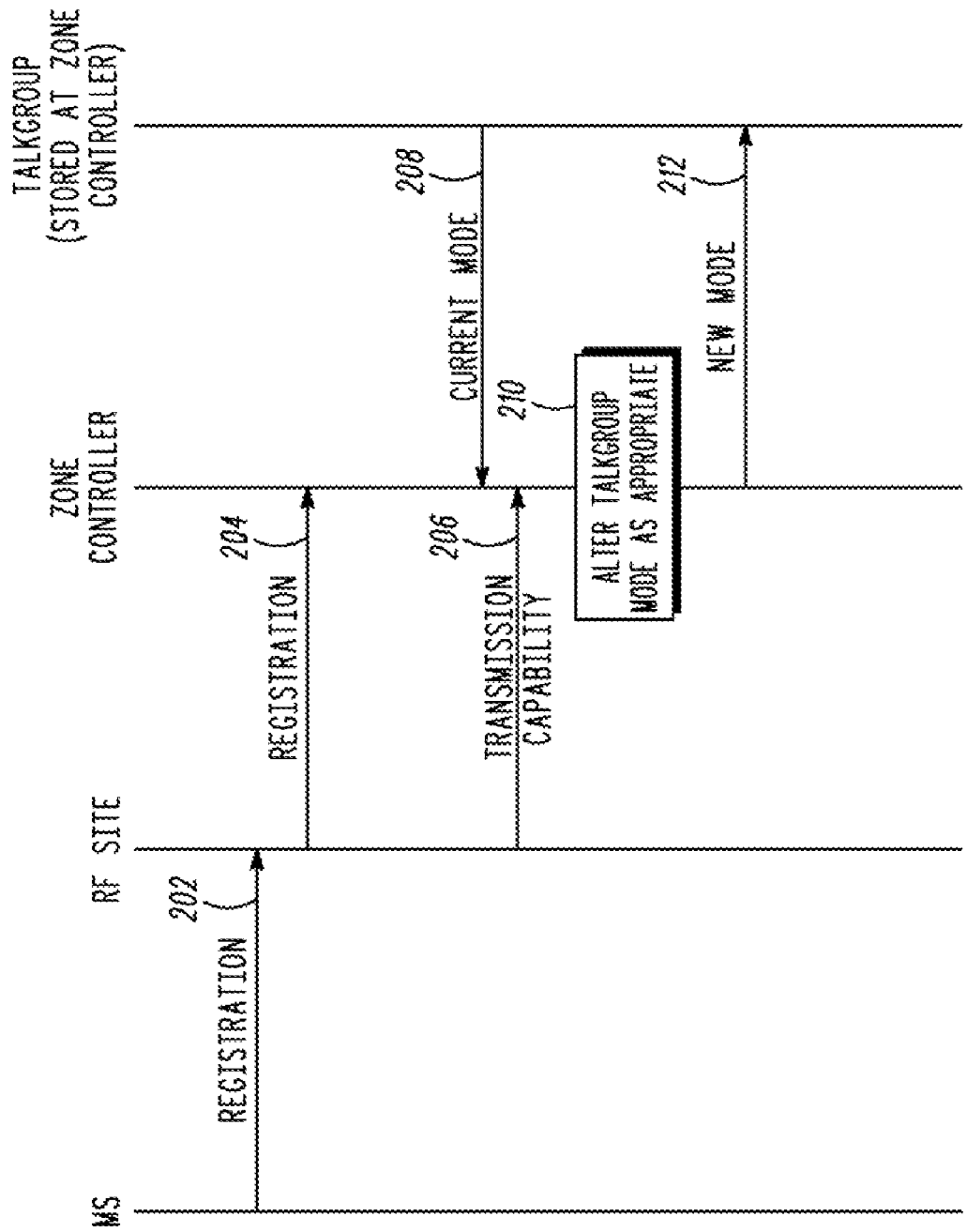
FIG. 2 is a call flow diagram of an approach for dynamically determining the mode of a talk group according to various embodiments of the present invention.

Referring now to FIG. 2, one example of an approach for dynamically adjusting the operating mode of a talk group is described. At step 202, the mobile station (MS) sends a registration message to an RF site. The mobile station then affiliates with the talk group. The registration message includes the transmission capability of the mobile station (MS).

An example of this message is a unit registration message sent upon power up of the mobile station. Alternatively, a user may pre-program the capability at the site or the Zone Controller or the site may determine the mode from other information received from the mobile station (MS). At step 204, the registration message is relayed from the RF site to the zone controller.

At step 206, the RF site sends its transmission capability to the zone controller. Alternatively, the zone controller may maintain information concerning the operating mode of the RF site or the zone controller may determine the transmission mode from other information received from the RF site.

The zone controller tracks the talk group mode based upon several factors (e.g., transmission capability of mobile station affiliated, transmission capability of RF sites with affiliated mobile stations, user preference). At step 208, the current mode of the talk group is forwarded to the zone controller. The information concerning the talk group may be stored in a memory at the zone controller for ease of retrieval.

At step 210, the zone controller determines whether to alter the mode of the talk group. This determination may be based upon the transmission capability of the mobile station, the transmission mode of the RF site, user preferences, and the current mode of the talk group. The use of other factors is possible.

At step 212, the zone controller alters the current mode of the talk group, as needed. This step is executed whenever the determination at step 210 indicates the mode should be changed. If no change is required, the current mode of the talk group remains unchanged by the zone controller.

Figure 3:
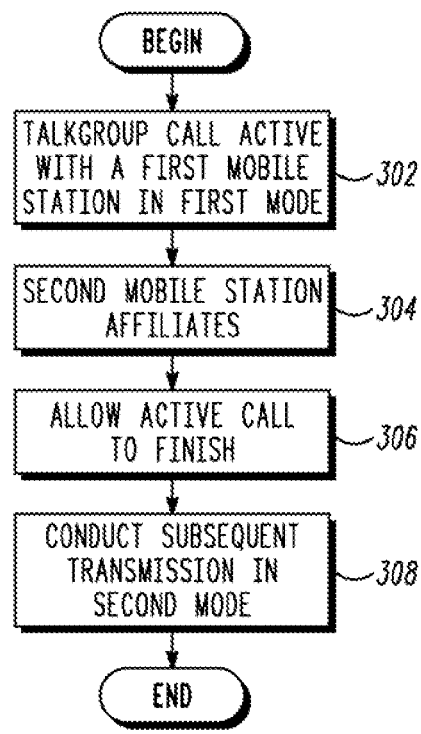
FIG. 3 is a flow chart of another approach for dynamically determining the operating mode of a talk group according to various embodiments of the present invention.

Referring now to FIG. 3, an example of the impact of a mobile station affiliating with a talk group active in a call is described. At step 302, a talk group call is active in a first transmission mode (e.g., TDMA or half-rate). At step 304, a second mobile station that is only capable of operating in a second transmission mode (FDMA or full rate) affiliates with the same talk group during the active call. When this occurs, at step 306, the active call is allowed to continue in the current transmission mode (TDMA or half-rate) but the affiliating mobile station will not participate in the active call.

At step 308, once the call ends, subsequent transmission, until the talk group transmission mode is reevaluated, occurs in the second transmission mode (e.g., FDMA or full rate vocoder). This allows all mobile stations in the talk group to participate in the call.

Figure 4:
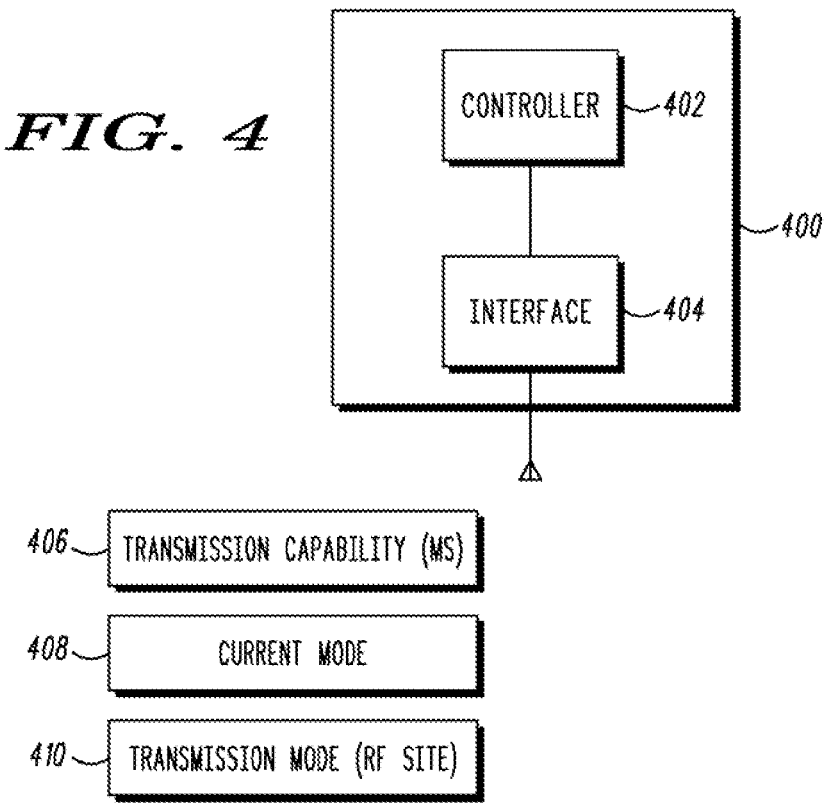
FIG. 4 is a block diagram of a zone controller for dynamically determining the operating mode of a talk group according to various embodiments of the present invention.

Referring now to FIG. 4, one example of a device 400 (e.g., a zone controller) for dynamically adjusting the operating mode of a talk group is described. The device includes a controller 402 and an interface 404.

The interface 404 receives transmission capability information 406 (e.g., mode of mobile stations, RF site capability, and user preference) from which a transmission capability can be calculated. The transmission capability 406 may be a full rate vocoder-only capability or a full and half-rate vocoder capability in one example. Other examples are possible.

The controller 402 is programmed to selectively adjust the current transmission mode 408 of the talk group based at least in part upon the transmission capability 406 of the mobile station, and the current transmission mode 408 of the talk group, and/or a transmission mode 410 of at least one RF site associated with the talk group and/or a user preference.

In one example, the controller 402 may be programmed to compare a first number of mobile stations operating in the talk group in a first mode to a second number of mobile stations operating in a second mode. Based upon the comparison (e.g., whether the first number exceeds the second number), the current transmission mode of the talk group may be altered.

The interface 404 may also be adapted to receive a user configuration preference. For example, the user configuration preference may be FDMA-only, full rate vocoder only, TDMA-only, half-rate vocoder only, or dynamic. The controller 402 may be programmed to set the current transmission mode of the talk group based upon the user configuration preference.

Figure 5:
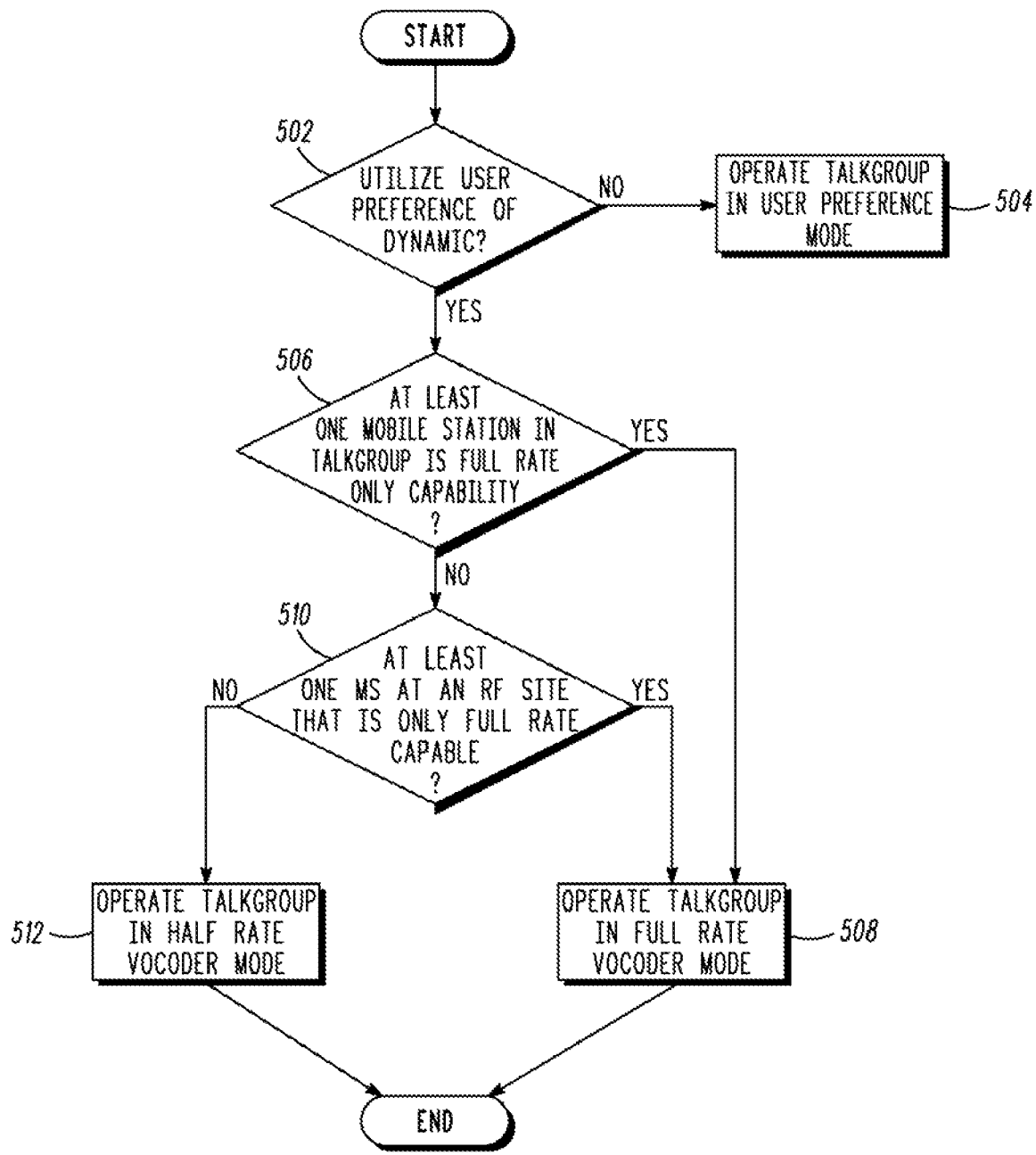
FIG. 5 is a flowchart of one approach for determining the operating mode of a talk group according to various embodiments of the present invention.

Referring now to FIG. 5, one example of an approach for determining the operating mode of a talk group is described. This example relates specifically to mobile stations that are operating in full rate vocoder mode or either full rate vocoder or half rate vocoder modes. However, it will be understood that other modes, protocols, and/or technologies can also be used and the specific determination of whether and how to switch the talk group mode will depend upon the nature of these modes, protocols, and technologies. In addition, other capabilities could be used to make these determinations.

At step 502, it is determined whether a user preference of dynamic will be utilized. If the answer is negative, control continues at step 504 where the talk group is operated in user preference (non-dynamic) mode (i.e., the mode selected by the user).

If the answer at step 502 is affirmative, then at step 506 it is determined if at least one mobile station in the talk group is full rate only capable. If the answer is affirmative, at step 508, the talk group is operated in full rate vocoder mode.

If the answer at step 506 is negative, at step 510, it is determine if at least one mobile station is at an RF site that is only full rate capable. If the answer is affirmative, step 508 is executed as described above. If the answer is negative, at step 512, the talk group is operated in half-rate vocoder mode.

Thus, approaches are provided that allow users to operate their mobile stations according to multiple modes or protocols. When the user roams to different RF sites or otherwise changes transmission modes, the user can continue communication and not have their communication interrupted or suspended.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of determining a current transmission mode for a talk group comprising:
    registering a mobile station with a transmission capability;
    affiliating the mobile station with a talk group; and
    determining whether to alter a current transmission mode of the talk group based at least in part upon the transmission capability of the mobile station, a current transmission mode of the talk group, and a transmission capability of at least one Radio Frequency (RF) site associated with the talk group.

2. The method of claim 1 wherein determining whether to alter a current transmission mode of the talk group further comprises comparing a first number of mobile stations operating at the talk group according to a first mode to a second number of mobile stations operating according to a second mode and determining whether to alter the current transmission mode based upon the comparing.

3. The method of claim 1 wherein receiving a transmission capability comprises receiving a capability selected from a group comprising a full rate vocoder-only capability, a full and half-rate vocoder capability, frequency division multiple access (FDMA) capability, time division multiple access (TDMA) capability and FDMA and TDMA (FDMA/TDMA) capability.

4. The method of claim 1 wherein determining whether to alter the current transmission mode of the talk group comprises determining whether to alter the current transmission mode, the current transmission mode being selected from a group comprising a full rate vocoder-only, half-rate vocoder, FDMA and TDMA.

5. The method of claim 1 wherein determining whether to alter a current transmission mode of the talk group comprises determining whether to alter the current transmission mode of the talk group based at least in part upon the transmission capability of the mobile station, a current transmission mode of the talk group, a user preference, and the transmission capability of the at least one RF site associated with the talk group.

6. The method of claim 5 further comprising setting the current transmission mode of the talk group based at least in part upon the user preference.

7. The method of claim 6 wherein the user preference is selected from a group comprising Frequency Division Multiple Access (FDMA)-only, time division multiple access (TDMA)-only, half-rate vocoder only, full rate vocoder only and dynamic.

8. A method of conducting communications with a mobile station comprising:
   conducting a first talk group communication with a mobile station, the first talk group communication being operated according to a first transmission mode;
   attempting to affiliate the mobile station with a second transmission mode capability to the talk group active in the talk group communication;
   allowing the first talk group communication to end; and
   conducting a second communication from the mobile station, the second talk group communication being operated according to the second transmission mode.

9. The method of claim 8 wherein the first transmission mode is time division multiple access (TDMA) and the second transmission mode is frequency division multiple access (FDMA).

10. A device for determining the mode of operation of a talk group comprising:
   an interface for receiving registration information comprising a transmission capability from a mobile station that requests to be affiliated with a talk group; and
   a controller coupled to the interface and programmed to selectively adjust a current transmission mode of the talk group based at least in part upon the transmission capability of the mobile station, and the current transmission mode of the talk group and a transmission mode of at least one Radio Frequency (RF) site associated with the talk group.

11. The device of claim 10 wherein the controller is programmed to compare a first number of mobile stations operating in the talk group in a first mode to a second number of mobile stations operating in a second mode and selectively alter the current transmission mode based upon the comparison.

12. The device of claim 10 wherein the transmission capability is selected from a group comprising a full rate vocoder-only capability, a full and half-rate vocoder capability, frequency division multiple access (FDMA), time division multiple access (TDMA), and FDMA and TDMA (FDMA/TDMA).

13. The device of claim 10 wherein the interface is adapted to receive a user configuration preference.

14. The device of claim 13 wherein the user configuration preference is selected from a group comprising Frequency Division Multiple Access (FDMA)-only, time division multiple access (TDMA)-only, half-rate vocoder only, full rate vocoder only and dynamic.

15. The device of claim 14 wherein the controller is programmed to set the current transmission mode of the talk group further based at least in part upon the user configuration preference.

16. The device of claim 10 wherein the mode of the talk group is selected from a group comprising full rate vocoder only, half-rate vocoder, FDMA and TDMA

* * * * *